United States Patent
McCorkendale et al.

(10) Patent No.: US 8,880,048 B1
(45) Date of Patent: Nov. 4, 2014

(54) METHOD AND APPARATUS FOR MANAGING CALLS FOR CALL-RELATED CALENDAR ENTRIES STORED ON A DEVICE

(75) Inventors: Bruce McCorkendale, Manhattan Beach, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 925 days.

(21) Appl. No.: 12/414,226

(22) Filed: Mar. 30, 2009

(51) Int. Cl.
*H04M 3/00* (2006.01)

(52) U.S. Cl.
USPC ......... 455/418; 455/416; 455/566; 455/556.2

(58) Field of Classification Search
USPC ............ 455/566, 556.2, 456.1, 416, 518, 519
See application file for complete search history.

(56) References Cited

U.S. PATENT DOCUMENTS

| | | | |
|---|---|---|---|
| 2003/0013483 A1* | 1/2003 | Ausems et al. | 455/556 |
| 2007/0032267 A1* | 2/2007 | Haitani et al. | 455/556.2 |
| 2007/0150444 A1* | 6/2007 | Chesnais et al. | 707/3 |
| 2009/0170492 A1* | 7/2009 | Lee | 455/418 |
| 2010/0098230 A1* | 4/2010 | Bhow | 379/202.01 |
| 2010/0150330 A1* | 6/2010 | Perry et al. | 379/202.01 |
| 2010/0211911 A1* | 8/2010 | Logan et al. | 715/808 |

* cited by examiner

*Primary Examiner* — Kwasi Karikari
(74) *Attorney, Agent, or Firm* — Wilmer Cutler Pickering Hale and Dorr LLP

(57) ABSTRACT

Method and apparatus managing calls for call-related calendar entries stored on a device is described. In some examples, calendar entries stored in the device are parsed to detect call-related calendar entries. A telephone number associated with each of the call-related calendar entries is extracted. An invocator is provided in the device that is configured to cause the device to dial the telephone number associated with a first call-related calendar entry of the call-related calendar entries that is within a temporal threshold of a current time maintained by the device.

19 Claims, 2 Drawing Sheets

METHOD AND APPARATUS FOR MANAGING CALLS FOR CALL-RELATED CALENDAR ENTRIES STORED ON A DEVICE

BACKGROUND OF THE INVENTION

1. Field of the Invention

The present invention relates generally to communication devices. More particularly, the present invention relates to managing calls for call-related calendar entries stored on a device.

2. Description of the Related Art

Many users of computers, personal digital assistants (PDAs), smart telephonic devices ("smart phones"), and the like utilize a personal information manager (PIM) that manages various information, including a calendar. The PIM typically allows the user to input appointments, which are tracked and shown on the calendar. The PIM allows the user to input various information associated with the appointment, such as the time, the subject, the participants, comments, telephone numbers, contacts, and the like. The PIM also typically provides a reminder function, where a visual and/or audible reminder is presented to the user for each upcoming appointment.

Many users repeatedly face a common task: a user has a conference call scheduled at a particular time and the user's calendar includes the necessary dial-in information. The PIM generates a reminder for the conference call. In response to the reminder, the user looks-up the dial-in information and dials the number to connect to conference, often using the same device that contains the calendar and that just delivered the reminder for the conference call. This technique, however, requires the user to obtain the dial-in number and manually enter the number in to the device to make the call. Further, the user may have to manually enter one or more meeting identifiers before being connected to the correct conference. On a smart phone, for example, a user may have to constantly switch back and forth between the calendar application and a dialing application in order to input the dial-in number and/or meeting identifier numbers to join the conference.

Accordingly, there exists a need in the art for a more efficient mechanism to connecting to a conference call in response to a reminder from a calendar application.

SUMMARY OF THE INVENTION

Aspects of the invention relate to a method and computer readable medium for managing a call from a device. In some embodiments, calendar entries stored in the device are parsed to detect call-related calendar entries. A telephone number associated with each of the call-related calendar entries is extracted. An invocator is provided in the device that is configured to cause the device to dial the telephone number associated with a first call-related calendar entry of the call-related calendar entries that is within a temporal threshold of a current time maintained by the device.

Another aspect of the invention relates to an apparatus. In some embodiments, the apparatus includes: a memory configured to store a calendar database having calendar entries; a telephone module configured to make calls over a network; and a processor, coupled to the memory and the telephone module, configured to: parse the calendar entries in the calendar database to detect call-related calendar entries; extract a telephone number associated with each of the call-related calendar entries; and generate an invocator configured to cause the telephone module to dial the telephone number associated with a first call-related calendar entry of the call-related calendar entries that is within a temporal threshold of a current time maintained by the device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
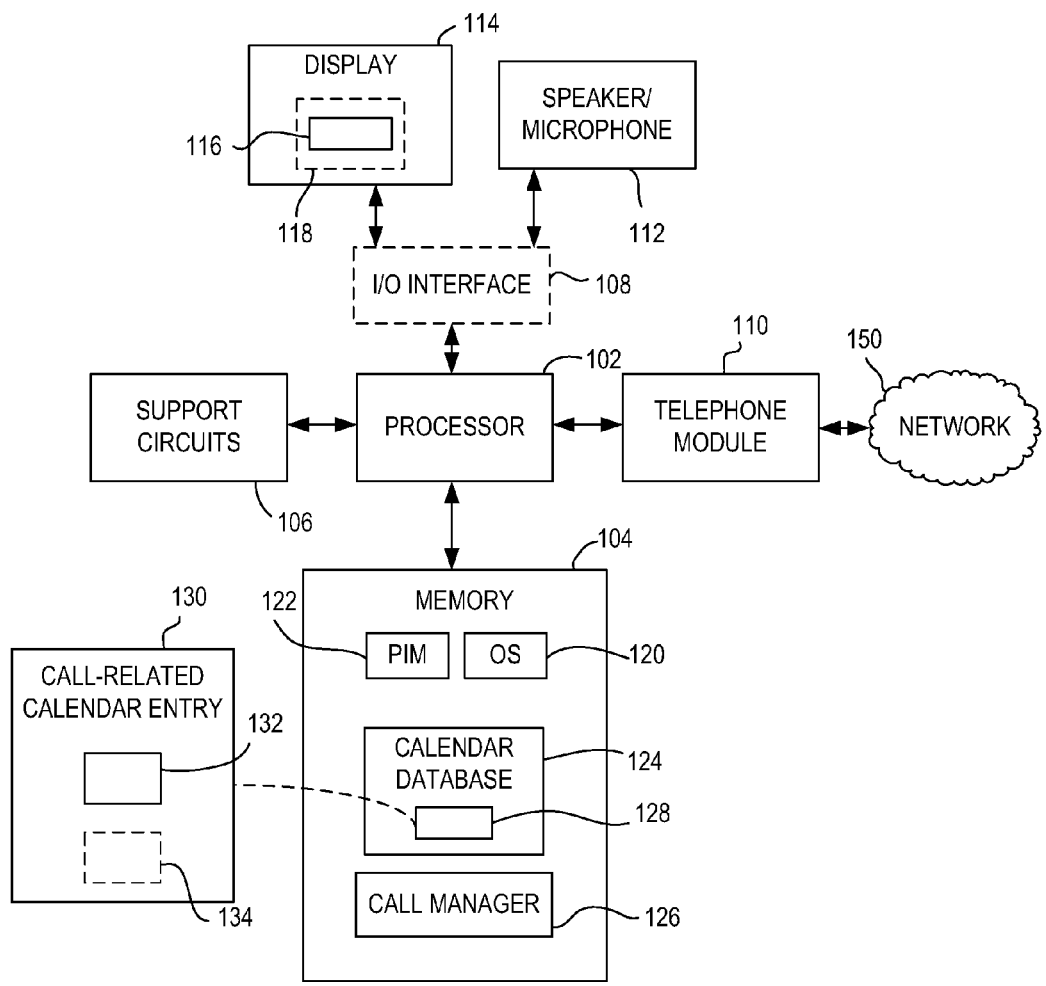
FIG. 1 is a block diagram depicting a communication device according to some embodiments of the invention.

FIG. 1 is a block diagram depicting a communication device 100 according to some embodiments of the invention. The communication device 100 generally includes a processor 102, a memory 104, various support circuits 106, and a telephone module 110. The processor 102 may include one or more microprocessors known in the art. The support circuits 106 for the processor 102 include conventional cache, power supplies, clock circuits, data registers, I/O interfaces, and the like. The telephone module 110 is configured to make telephone calls ("calls") over a network 150. The memory 116 may include one or more of the following random access memory, read only memory, magneto-resistive read/write memory, optical read/write memory, cache memory, magnetic read/write memory, and the like.

The communication device 100 is shown logically and may have a various physical implementations. In some embodiments, the communication device 100 includes a display 114 and speaker/microphone circuitry 112 coupled to the processor 102. For example, the communication device 100 may be implemented as a wireless telephone device (e.g., a "smart phone"), a personal digital assistant (PDA), notebook computer, or the like. In other embodiments, the communication device 100 includes an input/output (I/O) interface 108 coupled the processor 102. The I/O interface 108 is configured to couple the communication device 100 to various input/output devices, such as the display 114 and the speaker/microphone circuitry 112. For example, the communication device may be implemented as a computer coupled to a display and a speaker/microphone circuitry.

The communication device 100 may be configured with a personal information manager (PIM) 122, an operating system (OS) 124, and a call manager 126. In some embodiments, the PIM 122 and the call manager 126 may be software stored in the memory 104 configured for execution by the processor 102. The PIM 122 and the call manager 126 may be managed by the OS 124. Although the PIM 122 and the call manager 126 are described as software modules, the PIM 122 and/or the call manager 126 may be implemented using various hardware circuits or a combination of hardware circuits and software.

The PIM 122 is configured to manage a calendar database 124. Through interaction with the PIM 122, a user may establish various calendar entries 128, which are stored in the calendar database 124. A calendar entry may include a subject, a time, a place, various notes, and the like associated with an appointment, meeting, or the like. Some of the calendar entries 128 may be related to telephonic appointments, meetings, and the like (generally referred to as a "telephone meeting"). A telephone meeting with more than two participants is sometimes referred to as a conference call. Those calendar entries related to telephone meetings are referred to as call-related calendar entries.

An exemplary call-related calendar entry 130 can include one or more telephone numbers 132. The telephone number(s) 132 can be used to establish a call to join the associated telephone meeting. In some cases, more than one telephone number is provided, e.g., different telephone numbers for the telephone meeting may for international callers versus regional callers versus local callers and the like. In some cases, the call-related calendar entry 130 can include one or more additional numbers 134. The additional number(s) 134 may include number(s) to be entered after a call to one of the telephone number(s) has been established. For example, conference calls typically require one or more identifiers to be entered in order to join a conference (e.g., meeting identifiers, pass codes, etc.).

Figure 2:
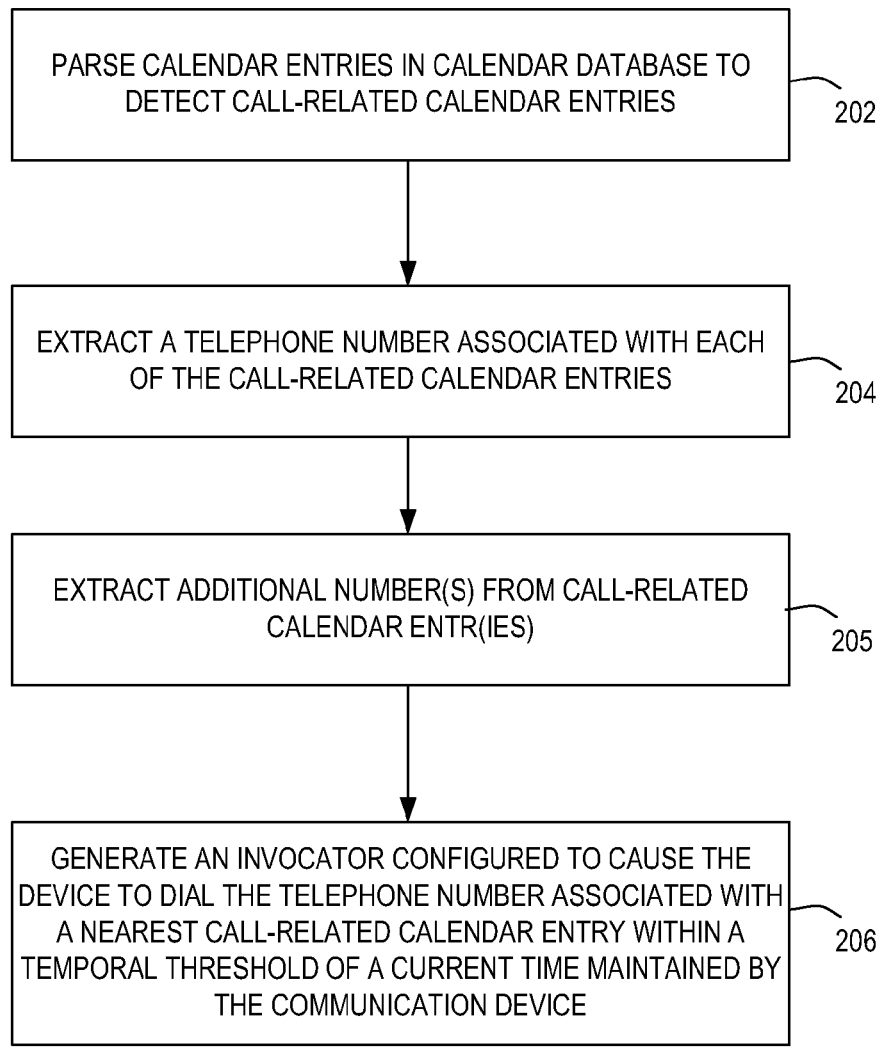
FIG. 2 is a flow diagram depicting a method for managing a call from a device according to some embodiments of the invention.

The call manager 126 is configured to manage calls from the communication device 100 for call-related calendar entries stored in the calendar database 124. FIG. 2 is a flow diagram depicting a method 200 for managing a call from a device according to some embodiments of the invention. The method 200 may be implemented by the call manager 126 in order to manage calls from the communication device for call-related calendar entries stored in the calendar database 124. For purpose of clarity, the method 200 is described with respect to the elements of the communication device 100 shown in FIG. 1.

The method 200 begins at step 202, where the call manager 126 parses the calendar entries 128 in the calendar database 124 to detect call-related calendar entries. A call-related calendar entry may have many different forms generally represented by the call-related calendar entry 130 shown in FIG. 1. The call manager 126 may be configured with various templates and/or rules enabling the detection of telephone number(s), pass code(s), meeting identifier(s), and the like ("call related information"). Having detected call-related information in a calendar entry, the call manager 126 can deem such calendar entry as a call-related calendar entry.

At step 204, the call manager 126 extracts a telephone number associated with each of the call-related calendar entries. The call manager 126 can detect and extract telephone numbers based on predefined telephone number formats, e.g., country code, area code, exchange, number, etc. If a call-related calendar entry includes multiple potential telephone numbers, the call manager 126 may either automatically select one of the potential telephone numbers or may solicit such a selection from the user. For example, in some embodiments, the call manager 126 can identify a locale from which the call will be made for the telephone meeting. The call manger 126 can obtain the locale from the OS 120, for example. The call manager 126 can then select the telephone number from the potential telephone numbers based on the locale. In other embodiments, the call manager 126 can display a list of the potential telephone numbers to the user via the display 114. The user can then select an appropriate telephone number, such selection being received by the call manager 126. In some embodiments, this user-based selection of the telephone number can take place within a temporal threshold of a meeting time established for the call-related calendar entry. For example, the user-based selection can occur concurrently with a visual and/or audible reminder generated by the PIM 122 for the call-related calendar entry.

At optional step 205, the call manager 126 extracts at least one additional number from one or more of the call-related calendar entries. For example, a given call-related calendar entry may be for a conference call that requires a meeting identifier and/or pass code to be entered in order to join the meeting.

At step 206, the call manager 126 generates an invocator configured to cause the device 100 to dial the telephone number associated with a nearest call-related calendar entry that is within a temporal threshold of a current time maintained by the communication device 100. The current time may be obtained from the OS 120, for example. Step 206 may be repeated as call-related calendar entries come within the temporal threshold of the current time. The temporal threshold may be a threshold time before and/or after the current time. For example, the invocator may be generated a number of minutes before a call-related calendar entry is scheduled to begin and/or a number of minutes after a call-related calendar entry was scheduled to have begun. In some embodiments, the invocator is further configured to cause the device 100 to enter the additional number(s) after the call has been established if such call-related calendar entry includes such additional number(s).

In some embodiments, the invocator is a graphical user interface (GUI) element 118 configured to be shown on the display 114. The GUI element 118 may be a button or the like that, when activated, causes the communication device 100 to dial the telephone number associated with a call-related calendar entry. In some embodiments, the invocator is included in a reminder 116 that is visually displayed to the user on the display 114 for the call-related calendar entry. As noted above, the PIM 122 may generate reminders for calendar entries as the start time approaches the current time. While the invocator 118 is shown as a GUI element, it is to be understood that the invocator may be a physical element on the device 100, such as a physical button or the like.

For example, in some particular non-limiting embodiments, the invocator 118 may be graphically shown as an arrow pointing to the left and an arrow pointing to the right. The arrow pointing to the left, if activated, may dial a telephone number for a nearest call-related calendar entry that is within temporal threshold before the current time. The arrow pointing to the right, if activated, may dial a telephone number for a nearest call-related calendar entry that is within a temporal threshold after the current time. In another non-limiting embodiment, the invocator 118 may be a single button that, by default, dials a telephone number for a nearest call-related calendar entry that is within a temporal threshold before the current time. Such a single button, when combined with a modifier (e.g., alt, control, shift, function, and like type keys), may instead dial a telephone number for a nearest call-related calendar entry that is within a temporal threshold after the current time. It is to be understood that the invocator may have any of a myriad of possible graphical implementations.

Regardless of the form, the invocator 118 provides a convenient mechanism to dial a telephone number for a telephone meeting. This obviates the need for the user to manually obtain the telephone number from the calendar entry and manually enter the telephone number to make the call. The call manager 126 automatically analyzes calendar entries stored in the device in order to collect the relevant telephone numbers, and provides the invocator for use in dialing the telephone numbers without requiring manual entry of the telephone numbers. In response to activation of the invocator 118 by the user, the call manager 126 can interact with the telephone module 110 in order to facilitate the dialing of the telephone number and optional entry of additional number(s) after the call.

The telephone module 110 may have many implementations, depending on the implementation of the communication device 100. For example, in cases where the communication device 100 is a PDA or smart phone, the telephone module 110 may be a wireless telephone module configured to communicate with a wireless telephone network. In cases where the communication device 100 is a computer, the telephone module 110 may be a voice over internet protocol (VOIP) or the like type client configured to communicate over a packet network, such as the Internet.

Aspects of the methods described above may be implemented as a program product for use with a computer system. Program(s) of the program product defines functions of embodiments and can be contained on a variety of computer readable media, which include, but are not limited to: (i) information stored permanently on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of managing a call from a device, comprising:
parsing calendar entries stored in the device to detect call-related calendar entries;
extracting detecting a plurality of telephone numbers associated with a first call-related calendar entry of the call-related calendar entries that is within a temporal threshold of a current time maintained by the device; and
providing an invocator in the device configured to identify a locale from which a call will be made, select at least one extracted a telephone number to dial from the plurality of telephone numbers based on the locale from which the call will be made, and cause the device to dial the selected at least one extracted telephone number associated with the first call-related calendar entry, wherein the selection is performed based on the locale from which a call will be made, and wherein the plurality of telephone numbers are associated with at least two countries.

2. The method of claim 1, wherein the step of providing comprises:
including the invocator in a reminder visually displayed by the device for the first call-related calendar entry.

3. The method of claim 1, wherein the invocator comprises a graphical user interface (GUI) element that, when activated, causes the device to dial the at least one extracted selected telephone number associated with the first call-related calendar entry.

4. The method of claim 1, further comprising:
extracting at least one additional number associated with each of the call-related calendar entries;
wherein the invocator is configured to cause the device to enter the at least one additional number after the at least one extracted selected telephone number has been dialed.

5. The method of claim 1, wherein the temporal threshold of the current time is either a threshold before the current time or a threshold after the current time.

6. An apparatus, comprising:
a memory configured to store a calendar database having calendar entries;
a telephone module configured to make calls over a network; and
a processor, coupled to the memory and the telephone module, configured to:
parse the calendar entries in the calendar database to detect call-related calendar entries;
extract detect a plurality of telephone numbers associated with each of the call-related calendar entries; and
generate an invocator configured to identify a locale from which a call will be made, select at least one extracted telephone number to dial from the plurality of telephone numbers based on the local from which the call will be made, and cause the telephone module to dial the selected at least one extracted telephone number associated with the first call-related calendar entry of the call-related calendar entries that is within a temporal threshold of a current time maintained by the device, wherein the selection is performed based on the locale from which a call will be made, and wherein the plurality of telephone numbers are associated with at least two countries.

7. The apparatus of claim 6, wherein the processor is configured to include the invocator in a reminder to be visually displayed for the first call-related calendar entry.

8. The apparatus of claim 6, wherein the invocator comprises a graphical user interface (GUI) element that, when activated, causes the telephone module to dial the at least one extracted selected telephone number associated with the first call-related calendar entry.

9. The apparatus of claim 6, further comprising:
a display;
wherein the processor is configured to cause the invocator to be shown on the display.

10. The apparatus of claim 6, wherein the processor is further configured to:
extract at least one additional number associated with each of the call-related calendar entries;
wherein the invocator is configured to cause the telephone module to enter the at least one additional number after the at least one extracted selected telephone number has been dialed.

11. The apparatus of claim 6, wherein the telephone module comprises a Voice over Internet Protocol (VoIP) client executed by the processor.

12. The apparatus of claim 6, wherein the telephone module is configured to make the calls wirelessly over a wireless network.

13. A non-transitory computer readable storage medium having stored thereon instructions that when executed by a processor cause the processor to perform a method of managing a call from a device, comprising:
parsing calendar entries stored in the device to detect call-related calendar entries;
extracting detecting a plurality of telephone numbers associated with each of the call-related calendar entries; and
providing an invocator in the device configured to identify a locale from which a call will be made, select at least one extracted a telephone number to dial from the plurality of telephone numbers based on the locale from which the call will be made, and cause the device to dial the selected at least one extracted telephone number associated with a first call-related calendar entry of the call-related calendar entries that is within a temporal threshold of a current time maintained by the device, wherein the selection is performed based on the locale from which a call will be made, and wherein the plurality of telephone numbers are associated with at least two countries.

14. The non-transitory computer readable storage medium of claim 13, wherein the step of providing comprises:
   including the invocator in a reminder visually displayed by the device for the first call-related calendar entry.

15. The non-transitory computer readable storage medium of claim 13, wherein the invocator comprises a graphical user interface (GUI) element that, when activated, causes the device to dial the at least one extracted selected telephone number associated with the first call-related calendar entry.

16. The non-transitory computer readable storage medium of claim 13, further comprising:
   extracting at least one additional number associated with each of the call-related calendar entries;
   wherein the invocator is configured to cause the device to enter the at least one additional number after the at least one extracted selected telephone number has been dialed.

17. The method of claim 1, wherein the locale comprises information regarding nation, region, or locality.

18. The method of claim 1, wherein the selection is performed by comparing the locale from which the call will be made with characteristics of the at least one extracted telephone number each telephone number of the detected plurality of telephone numbers.

19. The method of claim 1, wherein the extracting a detecting the plurality of telephone numbers is performed by the applying at least one of a template and a rule to the call-related calendar entry at least one of a template and a rule.

* * * * *